April 2, 1957     D. W. NORWOOD     2,787,419

CALCULATING DEVICE FOR DETERMINING FLASHLIGHT EXPOSURES

Filed May 18, 1953     2 Sheets-Sheet 1

INVENTOR.
Donald W. Norwood
BY

ATTORNEYS.

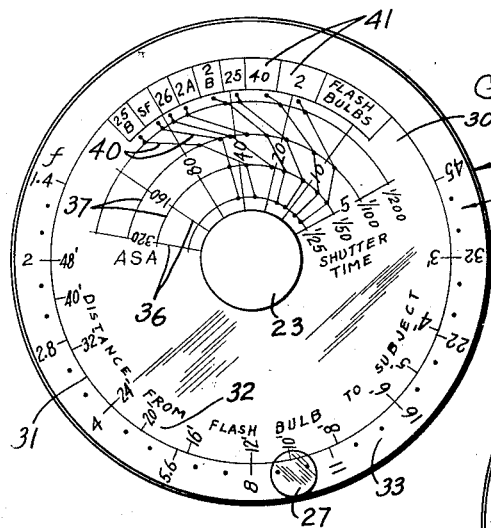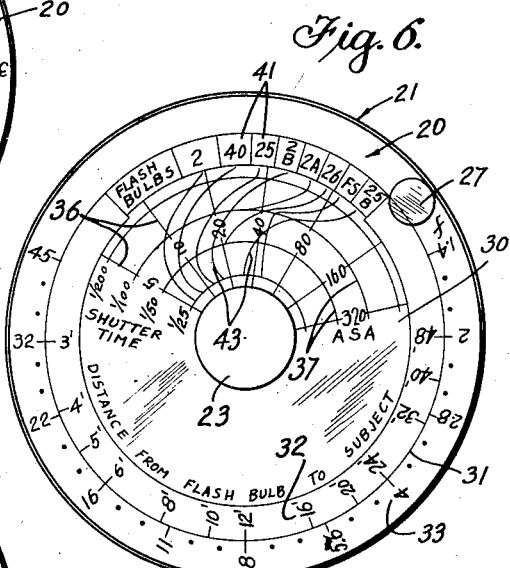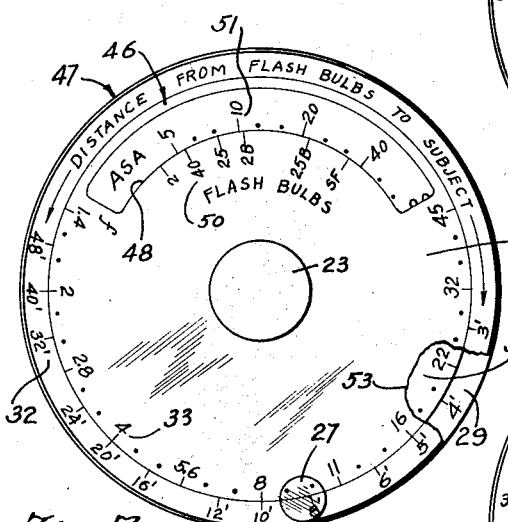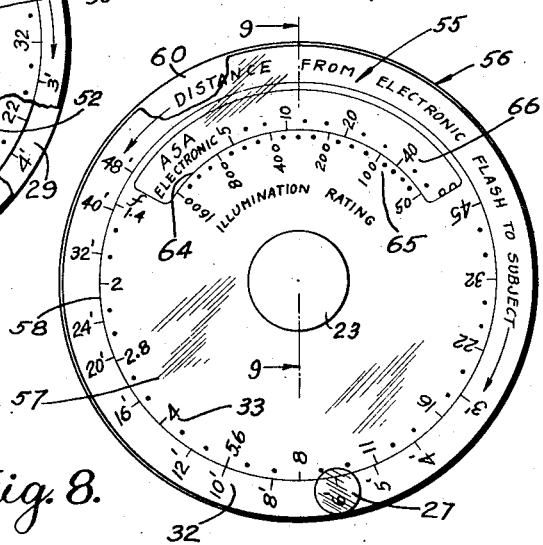

United States Patent Office 2,787,419
Patented Apr. 2, 1957

2,787,419

CALCULATING DEVICE FOR DETERMINING FLASHLIGHT EXPOSURES

Donald W. Norwood, Pasadena, Calif., assignor to Donald H. Norwood, trustee, Pasadena, Calif.

Application May 18, 1953, Serial No. 355,605

9 Claims. (Cl. 235—64.7)

This invention relates to photography and is directed to a simple and compact device for the rapid and exact determination of camera adjustments for exposures by flash light illumination.

In flash light photography, momentary illumination of the subject may be accomplished either by single-use flash bulbs that generate light by combustion, or by multiple-use flash bulbs of the electronic glow-tube type. The correct camera setting for any given illumination source must take into consideration the character of the illumination, which varies widely among flash bulbs, the sensitivity of the film, which varies widely among films, and the further fact that the intensity of the light that reaches the subject varies inversely as the square of the distance from the light source.

Assuming that the photographer knows the distance from the light source to the subject, and correctly focuses the camera on the subject, error may arise from failure to consider properly the character of the illumination radiated by the given light source, or may arise from failure to consider properly the speed rating or light sensitivity of the film in the camera. Even with correct consideration of these factors, the photographer may fail to determine what $f$ stop or camera aperture to use. Finally, even with the correct camera aperture, the photographer may spoil the picture by not allowing for the fact that the camera shutter may be adjusted for an exposure of shorter time duration than the time duration of the flash illumination.

The present invention comprises a simple calculating device which eliminates errors in properly correlating the ratings of flash bulbs and films, eliminates errors in computing the drop in illumination intensity with distance from the light source to the subject, eliminates the necessity for mental computation to arrive at correct camera adjustments, and, finally, in preferred practices of the invention, eliminates error which might otherwise arise from the effect of selected camera exposure time being so short as to cut off a portion of the momentary flash illumination.

For its purpose, the invention takes into consideration five basic factors that enter into problems of correct exposure in flash light photography. These basic factors may be listed as follows:

(1) Effective light developed by the flash. This may be called the flash light factor or simply the flash factor.

(2) Duration of shutter opening. This duration may be called the shutter time factor.

(3) Speed rating or relative sensitivity of the film. This speed rating may be called the film sensitivity factor.

(4) The diameter of the camera aperture relative to the focal length of the lens. This may be called the $f$ stop or aperture factor.

(5) The distance of the light source from the subject being photographed, i. e., the range factor or distance factor.

The invention contemplates handling these five factors by means of only four scales so that problems in flash light photography may be determined by a device comprising only two relatively movable scale members, each member having two scales, the two scales on one member cooperating respectively with the two scales on the other. With these two pairs of scales properly correlated on the two members, the setting of one pair of the scales for given values of some of the basic factors will position the other two scales relative to each other in accord with the remaining basic factors. Each of the preferred embodiments of the invention comprises two rotary members having a common axis of rotation. It is further preferable that the two rotary members overlap with one of their pairs of cooperating scales on their outer peripheral marginal portions and the other pair of cooperating scales positioned radially inward therefrom.

In what may be regarded as the simplest practice of the invention, the solution of five-factor exposure problems by four scales is accomplished simply by eliminating the shutter time factor as a variable. This elimination may be accomplished by assuming a shutter adjustment affording an exposure period long enough to include the illumination from any flash source, say a shutter adjustment of $\frac{1}{25}$ second. This practice of the invention is also applicable for use with electronic flash devices whose period of illumination is shorter than the shortest shutter time setting of any conventional camera. With the shutter factor eliminated, the four factors to be handled by the two scale members in the simplified practice of the invention are:

(1) Flash factor.
(2) Film sensitivity factor.
(3) Aperture factor.
(4) Distance factor.

One pair of cooperating scales on the two relatively movable scale members represents the flash factor and the film sensitivity factor, respectively. With this pair of scales set for the particular flash bulb to be used and for the particular film in the camera, the other pair of scales will be automatically positioned relative to each other to show the various combinations of aperture adjustments and distance from the flash source to the subject that will result in correct exposure of the film. Thus the second pair of scales makes it possible to select any given distance and find the correct aperture adjustment for that distance, or conversely, to select any given aperture adjustment and to find the corresponding distance between the light source and the subject that will result in proper exposure of the film.

An important object of other and preferred practices of the invention is to make four scales include all five of the variable factors and thus keep the device simple without sacrificing any of the factors. This object is accomplished by combining the shutter time factor with both the flash factor and the film sensitivity factor. Thus one of the scales, instead of representing simply the flash factor, represents the flash factor as limited by the shutter factor in all instances where the flash factor is so limited; and instead of using a scale that represents the film factor only, a scale is used that represents the film factor combined with the shutter time factor. In practice, the two scales involving the shutter time factor are what may be termed two-dimensional scales. One of the two relatively movable members has a scale with two dimensions representing the shutter time factor and the flash factor, respectively, and, for cooperation therewith the other of the two members has a scale with two dimensions representing the shutter time factor and the film sensitivity factor, respectively. In the preferred practice of the invention wherein the two members are rotary members, the two-dimensional scales are polar scales, that is, scales whose values are plotted according to polar coordinates.

A further specific object of the invention is to provide an arrangement of two overlapping scale members which will make it possible to adjust the two members relative to each other for correlation of two-dimensional scale values on one of the members with two-dimensional scale values on the other. A feature of the invention is the concept of attaining this object by placing the two scales on overlapping portions of the two members with the uppermost of the two portions transparent so that both of the two-dimensional scales will be visible simultaneously for guidance in the setting of the two members in accord with given values on the two two-dimensional scales.

Another object of the invention is to provide advantageous means for protecting the scales and indicia on both scale members from exposure to wear or attrition by contact with surrounding objects, and consequent injury or deterioration of the scales and indicia.

Another object is to provide a device in which the relative adjustment of the two scale members may be effected manually without interfering with full visibility of the scales.

The various features, objects and advantages of the invention will be apparent in the following detailed description considered with the accompanying drawings.

In the drawings, which are to be regarded as merely illustrative:

Fig. 5 is a face view of a second embodiment of the invention;

Fig. 6 is a face view of a third embodiment of the invention;

Fig. 7 is a face view of a fourth embodiment of the invention;

Fig. 8 is a face view of an embodiment of the invention for use with electronic flash bulbs; and Fig. 9 is a fragmentary sectional view taken as indicated by the line 9—9 of Fig. 8.

Figure 2:
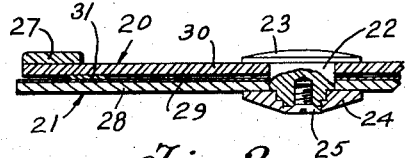
Fig. 2 is a fragmentary cross-sectional view taken along the line 2—2 of Fig. 1.
Figure 1:
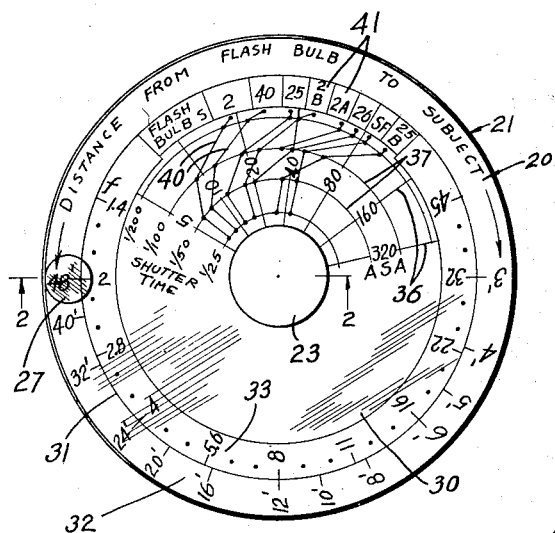
Fig. 1 is a face view of a selected embodiment of the invention.

The first embodiment of the invention shown in Figs. 1 to 4 comprises what may be termed a front rotary scale member 20 and a back rotary scale member 21, both mounted for relative rotation concentrically on a suitable pivot means. As best shown in Fig. 2, the pivot means may comprise a cylindrical body 22 extending through central apertures in the two members 20 and 21. The cylindrical body 22 is formed with a circular flange or head 23 to engage the front surface of the front rotary scale 20, and is provided with a cap member 24 in engagement with the rear surface of the back member 21. This pivot means may be made of suitable material such as brass with the cap member 24 secured to the body member 22 by a suitable screw 25. It is contemplated that the two scale members 20 and 21 will be freely rotatable relative to each other, preferably with light frictional resistance tending to maintain the various settings to which the two members may be adjusted.

The two rotary members 20 and 21 may be made of multiple parts suitably united together. In this instance, the back scale member 21 comprises a metal plate or disc 28 having bonded thereto at its front face a disc 29 of material such as paper suitable for the printing of indicia. The front scale member 20 comprises a disc 30 of suitable transparent material such as transparent plastic material or glass, having bonded thereto on its rearward or inner face, an annular ring 31 of thin sheet material such as paper. While it is contemplated that the two scale members 20 and 21 will be of substantially the same diameter, preferably the back scale member 21 is of slightly larger diameter than the front scale member, say larger by 1/32 inch to facilitate manual relative rotation of the two members. For the same reason the front scale member may be provided with a suitable projection to serve as a finger piece. In this instance the finger piece is a small transparent body 27 bonded to the front surface of the transparent disc 30 adjacent the periphery thereof.

The ring 31 is spaced outward a considerable distance from the central axis of the device, and is also spaced somewhat inward from the periphery of the device, so as to leave portions of transparent disc 30 unobstructed for viewing the scales described hereinafter on the back scale member 21.

It is contemplated that the two rotary scale members 20 and 21 will be provided on their outer marginal portions with coacting one-dimensional circular or arcuate scales representing the aperture factor and the distance factor respectively. In this instance, for example, the peripheral margin of the paper disc 29 of the back scale member 21 has printed thereon a distance scale 32 and for cooperation therewith, the paper ring 31 of the front scale member 20 has printed thereon an aperture scale 33. The scale 32 has a plurality of angularly spaced graduations with suitable markings designating different distances from the light source to the subject, for example, from 3 feet to 48 feet. The scale 33 has a plurality of angularly spaced graduations with markings designating different values of the camera aperture size, for example, from $f\,1.4$ to $f\,45$.

Figure 4:
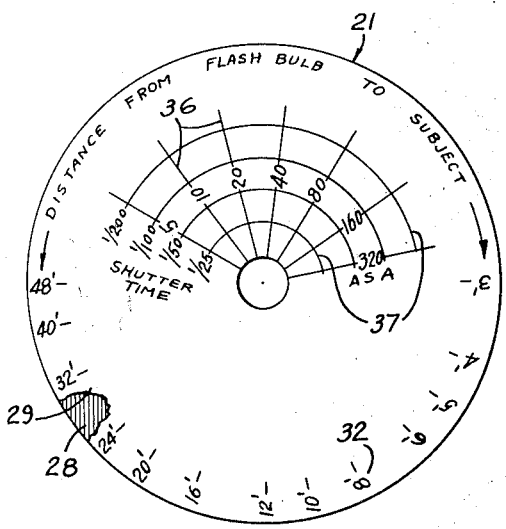
Fig. 4 is a face view of the other of the two scale members.

The forward face of the back scale member 21, in this first embodiment of the invention, is provided with a two-dimensional scale in the form of a polar grid scale printed on the paper disc 29, as best shown in Fig. 4. On this scale a plurality of angularly spaced radial grid lines 36 represent the film sensitivity factor and a plurality of radially spaced concentric grid lines 37 represent values of the shutter time factor.

The radial grid lines 36 represent the film sensitivity factor in terms of the conventional A. S. A. ratings of film speed, and are shown as including ratings of film speed ranging from 5 to 320 A. S. A. The concentric arcuate grid lines 37 representing values of the shutter time factor are show as being marked for four times intervals from 1/25 second to 1/200 second, each successive grid line reducing the shutter time by half. The two-dimensional polar grid scale comprising the radial lines 36 and arcuate lines 37 is located radially inward of the paper ring 31 on the front scale member, and the distance scale 32 is located radially outward of said paper ring. Since the disc 30 of front scale member 20 is transparent, the above described two-dimensional scale and distance scale on the back scale member are conveniently visible through the front scale member for guidance in adjusting the two scale members relative to each other.

Figure 3:
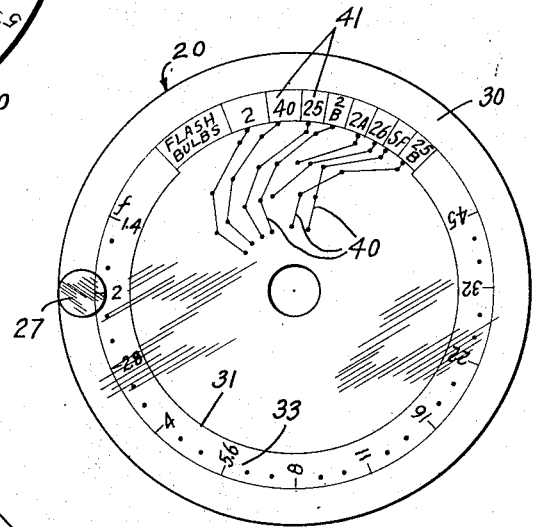
Fig. 3 is a face view of one of the two scale members in the device shown in Fig. 1.

For cooperation with the described two-dimensional scale on the back member 21, the transparent disc 30 carries a coacting two-dimensional scale which also involves concentric scale values for the shutter time factor. Since the concentric shutter time factor values are the same on both scales and since the two-dimensional scale on the back scale member is visible through the front scale member, concentric grid lines corresponding to the concentric grid lines 37 are omitted on the transparent front scale member, but, of course, they may be added if desired. On the front two-dimensional polar scale, as best shown in Fig. 3, a series of lines 40 represent the flash factor for different combustion-type flash bulbs as limited or modified by the shutter time factor. Each of these lines corresponding to a modified flash factor represents a flash light source of a given character, as indicated by the series of numbers 41 printed on the paper ring 31 to identify various flash bulbs. It will be noted that the modified flash factor lines 40 are of irregular angular configuration, and in nearly all instances the lines change direction between successive points of intersection with the concentric shutter factor grid lines 37. It is to be noted, moreover, that in each instance, the change in direction is towards radial alignment with respect to the axis of rotation of the scale member, rather than away from such radial alignment, and some of the lines actually terminate in such radial alignment.

The significance of the modified flash factor lines 40 with respect to their distribution and their changes in direction may be understood by considering the characteristics of different flash sources. Each line represents the relationship between the shutter time, plotted radially, and the effective illumination value of the corresponding flash light source, that is, the total illumination produced by the flash source during the different shutter time intervals, plotted circumferentially. Some flash sources start very rapidly. Others start slowly but later rise rapidly to a peak of intensity and then fall off rapidly. Some have a relatively flat illumination-level curve over a relatively long period. Some have an extremely short period of very intense illumination. As shown by the tabulation of numerals 41 in Fig. 3, the commonly used flash light bulbs fall into groups with respect to their total illumination output and with respect to the shape of their time-intensity curves.

Each of the angular lines 40 intersects the concentric shutter factor grid for $1/200$ second at a point which corresponds to the portion of the total quantity of light generated by a flash bulb of the given type that reaches the film within the limited time period of $1/200$ second. In most instances, the shutter factor of $1/200$ second is a limiting factor because most of the combustion-type flash bulbs provide illumination for a longer period than $1/200$ second. The fact that $1/200$ second is a limiting factor in most instances is indicated by the non-radial direction of the lines 40 between the $1/200$ second grid and the $1/100$ second grid line, as may be seen in Fig. 1. $1/100$ second is also a limiting factor in most instances, as indicated by the fact that most of the lines 40 are also non-radial in direction between the $1/100$ second grid line and the $1/50$ second grid line. In some instances, the $1/50$ second shutter factor is not limiting, as shown by the fact that the line 40, representing S. M. and S. F. flash bulbs, extends inward in a true radial direction from the $1/50$ second grid to the $1/25$ second grid.

The modified flash factor lines 40 of the two-dimensional scale on the front scale member 20 may be printed directly on the disc 30, preferably on the inner or rear face thereof. This two-dimensional scale is located radially inward of the paper ring 31, in position to register with and overlie the two-dimensional scale on the back scale member. If desired, the paper ring 31 might be omitted, the aperture scale 33 and flash bulb numbers 41 being printed directly on the transparent disc 30, preferably on the rear or inner face thereof. Likewise, the scales on the rear scale member may be printed directly on the front face of disc 28 instead of on a separate facing sheet such as the paper disc 29.

The operation of this embodiment of the invention may be readily understood from the foregoing description. In a typical procedure, the photographer has in mind the A. S. A. rating for the sensitivity of the film in his camera, and he notes the radial grid line 36 corresponding to this value on the two-dimensional polar grid scale carried by the back scale member 21. He next selects a desired camera shutter speed and notes the intersection of the corresponding concentric grid line 37 with the radial grid line 36 that represents the speed rating of the film in the camera.

The next step is to select the particular flash factor line 40 on the front scale member 20, that corresponds to the selected flash bulb, and then to adjust the two scale members relative to each other to place the selected line 40 on the front scale member in register with the previously determined intersection of lines 36 and 37 on the back scale member 21. The result is that the two scale members are now positionally related to each other in accord with the values of the film factor, the shutter factor, and the flash factor. Any limitation of the flash factor by the shutter factor is automatically taken into account.

With the two polar type scales adjusted relative to each other in this manner, the distance factor scale 32 on the back scale member 21 will be correlated with the aperture factor scale 33 on the front scale member 20 to show all the various usable combinations of distance and aperture adjustment that may be used. The photographer merely notes or measures the distance from the flash light source to the subject being photographed and then, opposite the corresponding distance value on the distance factor scale 32, he finds the correct setting of the aperture adjustment of the camera lens for a correctly exposed picture.

It is apparent that the operation of the device is quite flexible and that various sequences of steps may be followed. Thus the photographer may use the device to find the proper distance for the flash light source from the subject with the camera adjusted for both a predetermined aperture setting and a predetermined shutter time setting. Again the device may be used to ascertain, in advance, what type of flash bulb should be used with other of the factors assumed, including the film sensitivity factor, or may be used to determine what kind of film should be placed in the camera with certain other factors including the flash factor assumed.

Fig. 5 illustrates the fact that the first described embodiment of the invention may be modified by reversing the locations of the two two-dimensional polar type scales. In this construction which is, for the most part, identical with the first embodiment of the invention, the two-dimensional polar grid scale, comprising the radial lines 36 representing the film sensitivity factor and the intersecting concentric lines 37 representing the shutter time factor, is on the front scale member 20, instead of the back scale member. These lines 36 and 37 may be printed directly on the transparent disc 30 of the front scale member 20, preferably on the inner or rearward face thereof. The other two-dimensional scale, comprising the lines 40 representing the flash factor as modified by the shutter time factor, is on the back scale member 21, instead of the front scale member.

As before, the front scale member 20 is also provided with an aperture factor scale 33 and the back scale member 21 carries a distance factor scale 32 for cooperation with the scale 33. The aperture scale 33 may be printed directly on the inner face of the transparent disc 30 of the front scale member, or may be printed on a ring 31 of thin sheet material such as paper bonded to the inner face of said disc, said ring 31 being in this case located at the outer marginal portion of the front scale member so as to expose to view through the transparent disc 30 the distance scale 32 and the modified flash factor lines 40 and associated flash bulb numbers 41 on the back scale member. These markings on the back scale member may be printed directly on the front face of the back scale member which may comprise a disc of metal or other sheet material such as shown at 28 in Figs. 2 and 4, or they may be printed on a separate facing sheet of paper bonded to the front face of such disc 28, as shown at 29 in Figs. 2 and 4.

It is apparent that this second embodiment of the invention is utilized in exactly the same way as the first embodiment.

Fig. 6 illustrates other possible modifications in the first described embodiment of the invention. In this case, the distance scale 32 is on the front scale member 20 instead of the back scale member. It may be printed directly on the transparent disc 30, preferably on the inner or rear face thereof, or may be printed on the front face of the paper ring 31 secured to the rear face of said disc as described above. The aperture scale 33 which cooperates with scale 32 is on the back scale member 21 instead of the front scale member, and may be printed on the front face of the disc 28 or the paper disc 29 of Fig. 2. The scales 32 and 33 are otherwise the same as before except that they are reversed with respect to the direction of increasing values of distance and aperture size. The two two-dimensional scales are located on the respective scale members in the same manner as in the first described embodiment. However, a further modification is illustrated in Fig. 6, in that the lines of the two-dimensional scale on the front scale member 20, representing the flash factor as modified by the shutter time factor, are shown as curved lines 43 instead of the broken lines 40 previously described. The significance and purpose of these curved lines 43 are the same as the broken lines 40, and they are similarly identified by corresponding flash bulb numbers 41.

Fig. 7 shows, by way of example, how the invention may be embodied in a two member rotary device having four scales representing four of the five basic factors, the shutter speed factor being omitted. As heretofore mentioned, such an embodiment of the invention is used with the assumption that the shutter time adjustment of the camera is 1/25 of a second to provide an exposure interval that will not cut off the full period of illumination from the flash light source. It is to be understood, however, that the character and arrangement of the scales may be based on a factor other than 1/25 second.

The embodiment of the invention shown in Fig. 7 comprises a front scale member 46 and a back scale member 47 which are mounted in overlapping relationship in the manner heretofore described for relative rotation. The two scale members may be of approximately the same diameter, but the back member 47 is preferably slightly larger in diameter than the front member to facilitate manual adjustment thereof as brought out above. As before, the front scale member 46 is shown as a disc 30 of transparent material such as transparent plastic material, having a forwardly projecting finger piece 27 of transparent material secured to its front face adjacent its periphery. A disc 52 of thin sheet material such as paper is bonded to the transparent disc 30 at its rearward or inner face. A portion of disc 30 is broken away at 53 in the drawing to show the paper disc 52, which is of smaller diameter than transparent disc 30 so as to expose a circumferential marginal portion of the back scale member 47 to view through said transparent disc. The distance scale 32 representing the distance factor is on this circumferential marginal portion of the back scale member 47 and the cooperating aperture scale 33 is placed on the adjacent circumferential portion of the front scale member 46. A portion of the paper disc 52 is cut out to provide an arcuate window 48, along the inner margin of which is placed a one-dimensional flash factor scale 50 on the front scale member, comprising a series of angularly spaced graduations with letter and numeral symbols representing the different types of flash bulbs. In the radial zone of the back scale member 47 that corresponds to the radial zone of the window 48, the back scale member 47 is provided with a film sensitivity factor scale 51, comprising a series of angularly spaced graduations with numerals representing the A. S. A. ratings of films, for cooperating with the flash factor scale 50. The scale 51 is readily visible through the transparent disc 30 and window 48 of the front scale member.

The back scale member may comprise a metal disc as shown at 28 in Figs. 2 and 4 and may if desired be similarly provided with a facing disc 29 of paper or other thin sheet material bonded thereto at its forward face, the scales 32 and 51 being printed on the forward face of the metal disc or of said facing disc. The scales 33 and 50 may be printed directly on the transparent disc 30 of the front scale member, preferably on the inner or rearward face thereof, or on the forward face of the paper disc 52.

It is apparent that when the two scale members 46 and 47 of Fig. 7 are rotated relative to each other to position the flash factor scale 50 and the film sensitivity scale 51 in accord with the particular flash bulb being used and the particular rating of the film in the camera, the two scales 32 and 33 will be positioned relative to each other to indicate the various combinations of aperture factor and distance factor that will result in properly exposed pictures.

Figs. 8 and 9 illustrate an embodiment of the invention that is specialized for determining the correct camera adjustments for proper exposure of film with electronic flash devices as the source of illumination. This device is similar in construction to that shown in Fig. 7. It comprises a front rotary scale member 55 and a back rotary scale member 56, both of which are rotatably mounted on the same pivot means as heretofore described. In this instance, the front rotary scale member comprises a transparent disc 57 of glass or plastic material with a paper disc 58 of somewhat smaller diameter bonded to the inner or rearward face of the transparent disc. It is shown as provided with a peripherally disposed finger piece 27, as before. The back rotary scale member 56 is preferably of slightly greater diameter than the front scale member, and comprises a metal disc 59 on the front face of which is bonded a paper disc 60 of larger diameter than the paper disc 58.

The distance scale 32 is printed on the marginal portion of the paper disc 60 of the back scale member that is visible through the transparent disc 57 and the cooperating aperture scale 33 is printed on the peripheral margin of the paper disc 58 of the front rotary scale member 55. The paper disc 58 of the front scale member 55 has an arcuate window 64 to expose a radial zone of the paper disc 60 on the back rotary member and has a suitable flash factor scale 65 printed on the inner margin of the window 64. In this example the flash factor scale 65 is a scale representing the range of illumination effectiveness that covers the various electronic flash devices on the market. Within the radial zone unmasked by the arcuate window 64, the back paper disc 60 has a film sensitivity factor scale 66 based on A. S. A. ratings for film used with electronic flash.

Since the time duration of any electronic flash is shorter than the shutter time setting of any conventional camera, it is unnecessary to make any provision for the shutter time factor in this embodiment of the invention.

It is apparent that the four scales in the form of the invention shown in Fig. 8 are in the same relative locations as the four corresponding scales in the form of the invention shown in Fig. 7 so that the device shown in Fig. 8 may be used in the manner heretofore described. It will be further apparent to those skilled in the art that there may be various reversals with respect to the location of the four scales in these two devices of Figs. 7 and 8 as heretofore exemplified by Figs. 5 and 6.

All the forms of the invention described herein are characterized by the use of transparent sheet or plate material for the front scale member to permit indicia on the back scale member to be visible therethrough. A suitable transparent material for this purpose is a polymethyl methacrylate plastic sold under the trade name Lucite. One advantage of using transparent material for the front scale member is the fact that it permits the use of a two-dimensional scale on the front scale member superimposed on a two-dimensional scale on the back scale member for cooperation therewith, as heretofore explained. There are other important advantages as well.

One of the further advantages of employing transparent material for the front scale member is that the scales may be located on the two adjacent faces of the respective scale members, so that the two scale members protect the scales against such wear as would ordinarily make the scales illegible with the passage of time. In this regard, a feature of the described rotary forms of the invention is that with the two coaxial discs of substantially the same diameter, the scales on the adjacent faces of the two discs are protected by the two discs at all relative rotary positions of the two discs.

As heretofore stated, at least some of the indicia on the front scale member may be printed on thin sheet material such as paper, which is bonded to the inner or rear face of the transparent element of the front scale member. In such a construction, the printing on the paper is further protected by the paper itself, the paper serving as a protecting layer for the printing. The thin strip of sheet material secured to the rear face of the transparent element of the front scale member, as exemplified by the paper ring 31 or the paper disc 52 or 58, is also in frictional engagement with the front face of the back scale member so as to provide a desired frictional contact tending to hold the two scale members in adjusted positions relative to each other. It also serves to provide a slight spacing between the transparent element of the front scale member and the scales or other printed matter on the back scale member, so as to prevent injury to such printed matter by frictional engagement with the front scale member upon relative movement of the two members.

It is contemplated, however, that the scales may be printed directly on the rear or inner face of the front scale member and on the front face of the back scale member, the printing on each scale member being preferably covered with a thin coating of transparent plastic material to prevent wear by frictional contact thereof with the other scale member.

A further important advantage of using transparent material for the front scale member may be appreciated when it is considered that in every instance two coacting marginal portions of the two scale members must be simultaneously visible to make possible visual adjustment of the two scale members. If opaque material is used for the front scale member, the front scale member must necessarily be of smaller width or cross dimension than the back scale member to unmask marginal portions of the back scale member for observation. In fact, if opaque material were used for the front scale members in all of the described forms of the invention, the margin of the front scale member would necessarily be spaced inward from the margin of the back scale member along both of the opposite edges of the device.

With the marginal portions of the front scale member spaced inward from the marginal edges of the back scale member on the opposite edges of the device, it is necessary for the operator to extend his fingers across the margins of the back scale member to reach the front scale member for rotating the two scale members relative to each other. Thus, the operator will necessarily mask some of the indicia on the back scale member with his fingers and usually will mask some of the indicia on the front scale if both of the scale members are made of opaque material. With the front scale member made of transparent material, however, the operator need grasp only the extreme edge portions of the two scale members to cause relative movement. As heretofore pointed out, in the rotary forms of the invention, the back scale member may be slightly larger in diameter than the front scale member so that the user may hold the device by grasping only the edges of the back scale member and then may merely rub the surface of the front scale member to cause the desired relative rotation. It is also preferable, as heretofore stated, to provide a projection such as shown at 27 on the face of the transparent front scale member to serve as a finger piece. Such a projection may be a radial projection if desired.

It will be apparent to those skilled in the art that various changes, substitutions and other departures may be made from my disclosure within the spirit and scope of the appended claims.

I claim:

1. In a device for use in flash photography to determine correct camera adjustment on the basis of the illumination by the flash source as limited by the shutter time as a first factor, the sensitivity of the film combined with the shutter time as a second factor, the relative size of the aperture of the camera lens as a third factor, and the distance of the light source from the subject as a fourth factor, the combination of: two overlapping scale members relatively rotatable about a common axis, one of said members having a transparent portion provided with a two-dimensional polar scale representing one of the first two mentioned factors and having a one-dimensional scale representing one of the last two mentioned factors, the other of said two members having a portion provided with a two-dimensional polar scale representing the other of the first two mentioned factors for cooperation with the two dimensional scale on said one member and having a one-dimensional scale representing the other of the last two mentioned factors for cooperation with the one-dimensional scale on said one member said transparent portion of said one member overlying said portion of said other member.

2. A device as set forth in claim 1 in which said one-dimensional scales are on the marginal portions of the two rotary members and said two two-dimensional scales are positioned radially inward therefrom.

3. A device as set forth in claim 2 in which the two-dimensional scale representing the second mentioned factor has radial indices representing different degrees of sensitivity of film and has concentrically arranged indices representing different values of shutter time.

4. In a device for use in flash photography to determine correct camera adjustments on the basis of the effectiveness of the flash source as one factor, the sensitivity of the film in the camera as a second factor, the size of the aperture of the camera lens as a third factor, and the distance of the light source from the subject as a fourth factor, the combination of: a back scale member and a front scale member mounted for relative rotation about a common axis; said front scale member overlying said back scale member with marginal regions at opposite edges of the front scale member covering corresponding marginal regions of the back scale member, said front scale member being transparent to make the back scale member, including said corresponding marginal regions visible through the front scale member, scales representing the first two mentioned of said four factors being positioned respectively on said two scale members for mutual registration of values, scales representing the last two mentioned of said four factors being positioned respectively on said two scale members for mutual registration of their values, said four scales being correlated in their positions on the two members for mutual registration of correct values for the last two factors when the two members are set relative to each other in accord with the first two mentioned factors.

5. A device as set forth in claim 4 in which one of the scales representing the first two mentioned factors is on a marginal portion of one of said scale members towards one edge thereof and one of the scales representing the last mentioned factors is on a portion of the same scale member towards the opposite edge thereof.

6. A device as set forth in claim 4 in which the scales of the back member are on the front surface thereof and the scales of the front member are on the back surface thereof so that all of the scales are protected by the two scale members at all relative positions of the scale members.

7. A device as set forth in claim 6 in which one of the two cooperating pairs of scales is on marginal portions of the two members respectively near one edge of the device and the other cooperating pair is on the marginal portions of the two members respectively near the opposite edge of the device.

8. A device as set forth in claim 7 in which the back scale member is slightly larger in diameter than the front scale member to facilitate manual relative rotation of the two members.

9. In a device for use in flash photography to determine correct camera adjustment on the basis of the illumination by the flash source as limited by the shutter time as a first factor, the sensitivity of the film combined with the shutter time as a second factor, the relative size of the aperture of the camera lens as a third factor, and the distance of the light source from the subject as a fourth factor, the combination of: a back scale member and a front scale member relatively rotatable about a common axis, said front scale member overlying said back scale member; said back scale member having one portion provided with a two-dimensional polar scale representing one of the first two mentioned factors and having another portion provided with a one-dimensional arcuate scale representing one of the last two mentioned factors; said front scale member having a transparent portion overlying said one portion of the back scale member and provided with a two-dimensional polar scale representing the other of the first two mentioned factors for cooperation with the polar scale on the back scale member, and also having another portion provided with a one-dimensional arcuate scale representing the other of the last two mentioned factors for cooperation with the arcuate scale on the back scale member; one of said polar scales having a plurality of radially spaced concentric lines representing different values of shutter time common to both of said polar scales.

References Cited in the file of this patent

UNITED STATES PATENTS

| | | |
|---|---|---|
| 2,179,531 | Trapnell | Nov. 14, 1939 |
| 2,470,495 | Kohn et al. | May 17, 1949 |
| 2,485,191 | Culver | Oct. 18, 1949 |
| 2,517,590 | Mundorff | Aug. 8, 1950 |

FOREIGN PATENTS

| | | |
|---|---|---|
| 111,364 | Sweden | Aug. 1, 1944 |